W. H. SEAMAN.
Metallic-Retorts.

No. 203,379. Patented May 7, 1878.

Witnesses
D. P. Cowl
W. E. Chaffee

Inventor
Wm H C Seaman

UNITED STATES PATENT OFFICE.

WILLIAM H. SEAMAN, OF WASHINGTON, DISTRICT OF COLUMBIA.

IMPROVEMENT IN METALLIC RETORTS.

Specification forming part of Letters Patent No. 203,379, dated May 7, 1878; application filed June 27, 1877.

*To all whom it may concern:*

Be it known that I, WILLIAM H. SEAMAN, of the city of Washington, District of Columbia, have invented a new and useful Improvement in Metallic Retorts used by chemists, which improvement is fully set forth in the following specification and accompanying drawing, in which—

Figure 1:
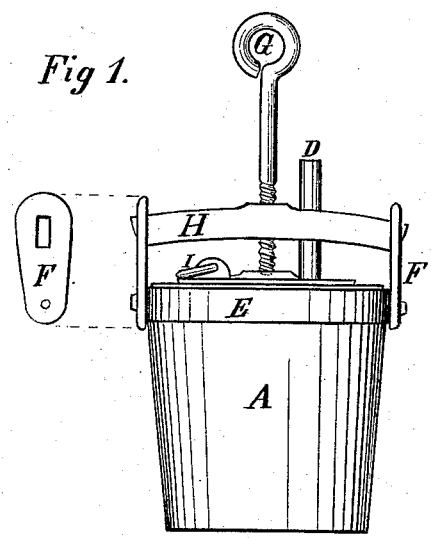
Figure 2:
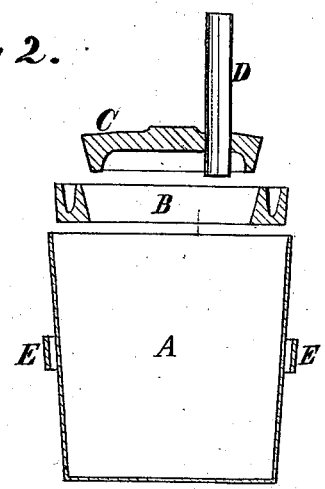

Figure 1 is a general view of my retort with detached drawing of ear. Fig. 2 is a sectional view of the principal parts slightly separated to better show their relations with each other.

The object of my invention is to render metallic retorts more convenient and useful, as well as less expensive than hitherto, by constructing them so that the kettle or part directly exposed to heat may be very thin, and when worn out readily removed from the head or connecting part of the retort and replaced by a new one. This replacement is impracticable in the retorts now used, which are either clumsy and inconvenient or quite expensive.

In the drawings the same letters refer to the same parts.

A is the body or kettle of the retort, made of any thin sheet metal, as tin, copper, or sheet-iron, plain or galvanized, slightly conical in form, tapering from the top downward. B is a ring, of cast metal, conical inside and outside, just fitting the top of the kettle A. C is a conical cap, ground in the mouth of the ring B, and carrying the tube D for the exit of distillation products, and the ring I for convenience of handling. E is a hoop, driven on the kettle A, furnished with the ears F, in which the ends of the yoke H are inserted. In this yoke the screw G works, the whole forming a gallows-screw, by which the kettle A, head B, and cap C are drawn tightly together or released with great facility.

The ears F may be attached directly to the kettle A, and the ring B may be turned upside down, and a straight-sided kettle into the groove K, said kettle being provided with a projecting fillet, against which the hoop E could press; but I much prefer the construction as shown in the drawing.

The loop on screw G is used to support the rubber tube or other connection with condenser, whereby said tube is held away from the hot retort or furnace used as a source of heat.

My invention is especially adapted to the making of oxygen on a small scale, but may be used in many other laboratory operations.

I am aware that gallows-screw heads have long been in use, and I do not claim the gallows-screw as any part of my invention; but I claim as my invention—

1. A metallic retort consisting of a head and detachable kettle, united to the head by a conical or driven joint, as shown and described.

2. The hoop E, with the ears F, in combination with the bar H and screw G, used to unite the two parts of a retort, as shown and described.

WM. H. SEAMAN.

Witnesses:
D. P. COWL,
W. F. SHUGERT.